(12) United States Patent
Machani

(10) Patent No.: US 8,051,297 B2
(45) Date of Patent: Nov. 1, 2011

(54) METHOD FOR BINDING A SECURITY ELEMENT TO A MOBILE DEVICE

(75) Inventor: Salah Machani, Toronto (CA)

(73) Assignee: Diversinet Corp., Toronto (CA)

( * ) Notice: Subject to any disclaimer, the term of this patent is extended or adjusted under 35 U.S.C. 154(b) by 1181 days.

(21) Appl. No.: 11/604,862

(22) Filed: Nov. 28, 2006

(65) Prior Publication Data

US 2008/0123843 A1 May 29, 2008

(51) Int. Cl.
*G06F 21/00* (2006.01)
*G06F 7/04* (2006.01)

(52) U.S. Cl. .............................. 713/185; 726/17; 726/27

(58) Field of Classification Search .................. 713/170, 713/185; 726/18, 19, 20, 30; 705/56
See application file for complete search history.

(56) References Cited

U.S. PATENT DOCUMENTS

| | | | | |
|---|---|---|---|---|
| 5,046,082 A * | 9/1991 | Zicker et al. | .................. | 455/419 |
| 5,588,061 A * | 12/1996 | Ganesan et al. | ................ | 380/30 |
| 5,889,861 A * | 3/1999 | Ohashi et al. | ................. | 380/247 |
| 5,915,021 A * | 6/1999 | Herlin et al. | .................... | 705/67 |
| 6,396,612 B1 * | 5/2002 | Bjorndahl | ..................... | 398/121 |
| 6,504,932 B1 * | 1/2003 | Vasnier et al. | ................ | 380/273 |
| 6,880,079 B2 * | 4/2005 | Kefford et al. | ................ | 713/155 |
| 2002/0018569 A1 * | 2/2002 | Panjwani et al. | ............. | 380/247 |
| 2004/0209651 A1 * | 10/2004 | Tsukamoto | .................... | 455/558 |
| 2005/0154876 A1 * | 7/2005 | Buckley et al. | ............... | 713/156 |
| 2006/0140405 A1 * | 6/2006 | Thommana et al. | .......... | 380/201 |
| 2006/0206709 A1 * | 9/2006 | Labrou et al. | ................. | 713/167 |
| 2006/0269061 A1 * | 11/2006 | Balasubramanian et al. | | 380/247 |
| 2007/0214245 A1 * | 9/2007 | Hamalainen et al. | ......... | 709/223 |
| 2007/0258595 A1 * | 11/2007 | Choy | ............................ | 380/278 |
| 2008/0008316 A1 * | 1/2008 | Pilipchuk | ........................ | 380/45 |

* cited by examiner

*Primary Examiner* — Nathan Flynn
*Assistant Examiner* — Abdullah Almamun
(74) *Attorney, Agent, or Firm* — McMillan LLP

(57) ABSTRACT

According to an aspect of the present invention there is provided a method of binding a security element to a device, comprising: generating a passkey to encrypt the security element, the passkey being a combination of attributes, and one of the attributes being a Device ID associated with said device. Preferably, the device is a mobile device. The combination of attributes may include the following: a) a build secret, the build secret consisting of a string which is generated when the software application is created; b) a salt, the salt consisting of a random string; wherein the build string and the salt are stored as non-printable strings within encryption code of the passkey.

18 Claims, 1 Drawing Sheet

METHOD FOR BINDING A SECURITY ELEMENT TO A MOBILE DEVICE

FIELD OF THE INVENTION

The present invention relates to the field of security and encryption. In particular, it relates to methods of binding security elements, such as passwords, to mobile devices, such as mobile phones.

BACKGROUND OF THE INVENTION

The rapid increase in the use of online services for shopping, banking and other financial transactions has brought with it an increase in identity theft and fraud. The most common existing security techniques rely on the user having a password associated with an online identity (user name). However, schemes such as keystroke logging, phishing and similar techniques are used to improperly record or intercept passwords and the associated user names. Thus, the username/password data can be taken and used in fraudulent transactions, leading to loss of money, loss of time and loss of reputation, not only for the user whose identity was taken, but also for those parties who were fraudulently induced into believing they were transacting with the user.

The flaws in the username/password system have lead to the development of two-factor (also known as "strong") authentication systems. Two-factor authentication is based on two elements: 1) something the user knows (i.e. a password or PIN); and 2) something the user has (an authenticator, often a physical device referred to as a "fob"). The fob and the password are used together to provide an additional level of security, as either one, individually, is of no use without the other.

Despite the improved security, two-factor authentication is still of limited use due to the requirement of the hardware fob. Furthermore, each secure system requires its own fob, creating a problem for the user who then needs to keep track of the multiple fobs necessary for access to multiple services.

One method of two-factor authentication is the use of One-Time Password (OTP) authentication. Using OTP authentication, a new OTP value (OTP token) is generated for use on a per-event basis (e.g. each remote logon attempt) or on a time-window basis (e.g. once per minute). The user is typically required to use a fob, either to generate the OTP, or to contact the system and receive the OTP.

Ideally, the fob can be replaced by another device already carried by the user, such as a mobile phone or PDA, which stores a set of OTP credentials for use when access the secure system. However, this creates a new problem that must be addressed, namely, the requirement that the OTP credentials be properly encrypted and bound to the device.

SUMMARY OF THE INVENTION

According to an aspect of the present invention there is provided a method of binding a security element to a device, comprising: generating a passkey to encrypt the security element, the passkey being a combination of attributes, and one of the attributes being a Device ID associated with said device, encrypting the security element on the device using the passkey, and retrieving the Device ID from the device to decrypt the security element.

Preferably, the device is a mobile device. Also preferably, the combination of attributes includes the following: a) a build secret, the build secret consisting of a random alphanumeric string; b) a salt, the salt consisting of a random alphanumeric string; and wherein the build string and the salt are stored as non-printable strings within encryption code of the passkey.

Preferably, the security element is an OTP credential for use with a secure server.

Other preferable attributes used include a user passphrase, a software application ID associated with a software program used by said device and/or a network ID associated with a network service provider used by said mobile device.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
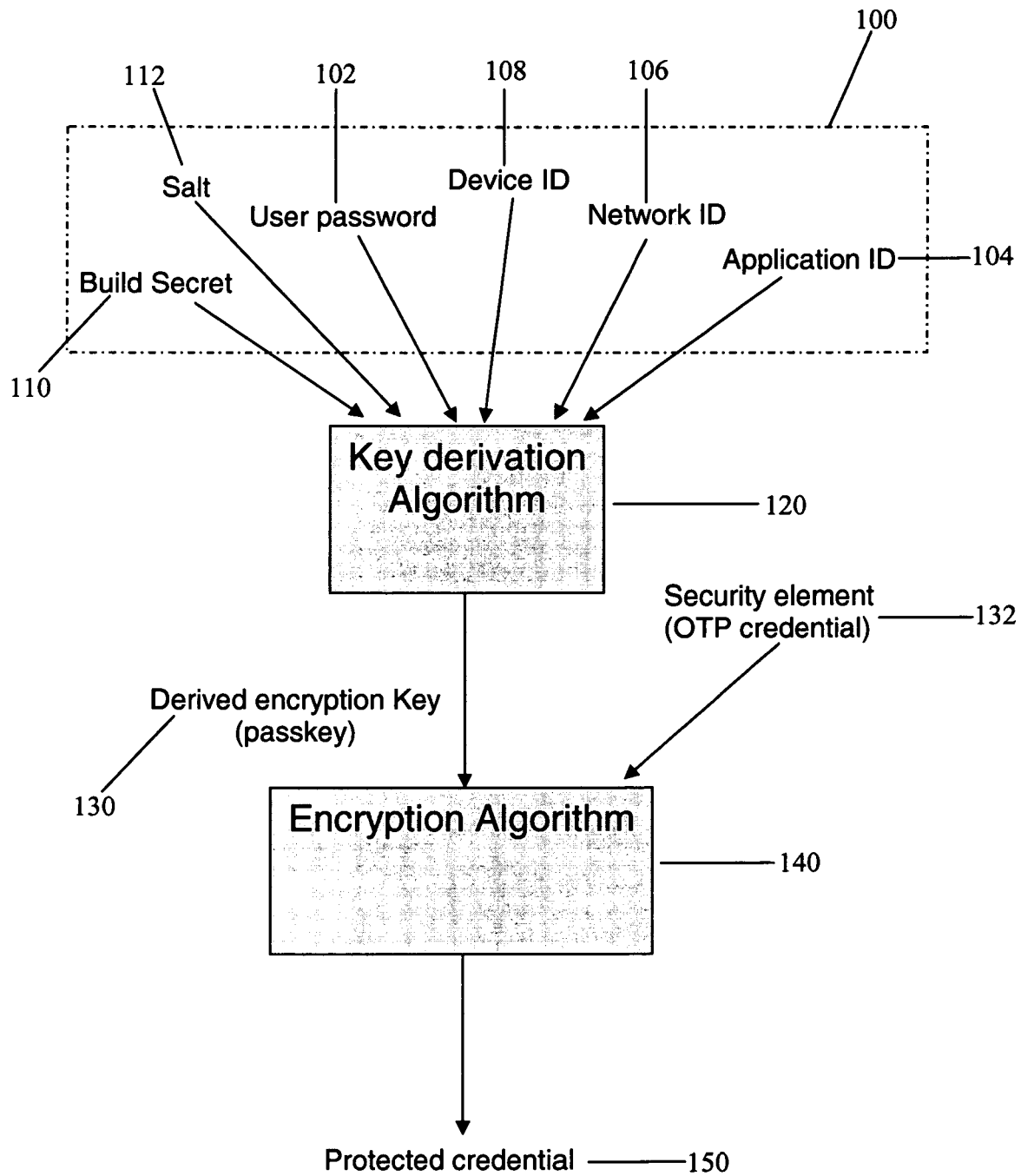
FIG. 1 is a block diagram of the passkey creation and credential encryption method.

The inventive method presented herein consists of binding a chosen security element to a specific mobile device used by a user at the time the security element is being supplied to the user. The method is of particular application when the security element needs to be generated by the secure server at the time of the first request by the user for access to the secure server. The security element is then used by the user for future access to the secure server from the mobile device.

The security element can be of any known type and is typically application and sever dependent. A preferred embodiment of security element is an OTP (One Time Password) credential which is stored on the mobile device to enable access to a secure server. The OTP credential is then used by the user during future transactions with the secure server as part of a two-factor authentication process.

With reference to FIG. 1, a combination of attributes 100 is used to create an encryption key, herein referred to as a passkey 130, is used to encrypt the security element. The attributes used to create the passkey can include one or more of: a user passphrase (i.e. a password or PIN) 102 (not the same password/PIN used in the two-factor authentication), an application (software) ID 104, a network ID 106, a device ID 108, and other randomly-generated strings 110, 112. Of these, the device ID 108 provides the strongest binding of the passkey 130 to the specific device.

An example of a passkey 130 meeting requirements for a Triple DES (Data Encryption Standard) key as generated by the inventive method is shown using four separate attributes combined to generate the passkey 130.

1) The Device ID 108. This is number, alphanumeric string or code that identifies the device being used by the user to connect to the server. Device IDs can be unique, such as the device's serial number or IMEI (International Mobile Equipment Identity) number. Alternatively, this can be a SHA-1 hash or other hash or digest of the phone number or email address associated with the device. In any case, the Device ID is read from the device every time the protected security element is accessed.

2) The build secret 110. A build secret is a randomly generated string (e.g. 20 characters) which is generated during the build of the application. The build secret is stored in the encryption code as a non-printable (non-accessible) string.

For additional security, the build secret 110 may be stored as a set of segmented non-printable strings in different parts of the code to make it more difficult to discover.

3) The salt 112. A salt is a random number generated during the build process. The salt is stored in the encryption code as a non-printable (non-accessible) string. As with the build secret 110, the salt 112 may be stored as a set of segmented non-printable strings in different parts of the code.

4) The user passphrase 102. This is a string of characters input by the user during the first access attempt. The passphrase can be changed by the user on their device at a later time. The user passphrase 102 is only known by the user and is not sent over the connection to the server.

The attributes are combined using a derivation algorithm 120 to create the passkey 130. Once the passkey 130 is created, it is used to encrypt 140 the security element (i.e. OTP credential) 132 stored on the device. The result is an encrypted, protected security element 150. When the user needs to decrypt the security element, they input the user passphrase 102, the Device ID 108 is read off the device, and the security element 150 is decrypted for use.

Thus, a form of two-factor authentication is now provided for the stored security element 150. If the device falls into the hands of an unauthorized user, the security element 150 is inaccessible without the user passphrase 102. Conversely, if the security element 150 is somehow removed from the device and the passphrase 102 obtained, it remains inaccessible as the proper Device ID 108 cannot be read.

This method can be modified or further expanded by using an application (software) ID 104 as an additional attribute of the passkey generation method or as a replacement for one of the existing attributes. An application ID 104 is a unique identifier associated with the software application instance used by the user, either to decrypt the security element, or to access the secure system. The application ID 104 is similar to the Device ID 108 in that it is a number, alphanumeric string or code that identifies the software application instance. The application ID 104 is created at the time the software is downloaded or installed on the device.

Another potential attribute is a network ID 106 associated with the network service provider used by the mobile device. Given that it is generally desirable to allow users to have the ability to switch service providers of their own volition, use of this attribute is likely to be limited. However, the network ID 106 could be used to restrict access to certain providers or certain geographic areas.

While the above method contemplates binding and protecting the security elements on the device, it is equally applicable for use in protecting the security element during the provisioning or transportation to the device. The binding process can be applied by repackaging or recompiling the software application for a specific user and device at the time of download.

While the above method has been presented in the context of mobile devices, such as mobile phones, the method is equally applicable to fixed devices, such as laptop or desktop PCs, as well. While fixed devices generally have superior integrated security measures than mobiles devices, the simplicity and device-branding capabilities of the method presented herein provide these same security benefits to fixed devices as well.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A method of binding a security element to a device, comprising:
   a) generating a build secret comprising a random string that is generated when a software application is created and stored as at least one non-printable string within code of said software application;
   b) generating a passkey to encrypt said security element on said device, said passkey being a combination of attributes associated with said device, wherein said attributes include a Device ID and said build secret;
   c) encrypting said security element on said device using said passkey; and
   d) retrieving said Device ID from said device as part of decrypting said security element.

2. The method of claim 1, wherein said device is a mobile device.

3. The method of claim 2, wherein said Device ID is one of: a serial number; an IMEI (International Mobile Equipment Identity) number; a digest or hash value derived from a phone number; or a digest or hash value derived from an email address.

4. The method of claim 1, wherein said combination of attributes additionally includes one or more of the following attributes:
   a) a salt, said salt consisting of a random string;
   b) a user passphrase, said user passphrase consisting of a string input by the user;
   c) an application ID associated with a program used by said device;
   d) a network ID associated with a network service provider used by said mobile device.

5. The method of claim 4, wherein said user passphrase is used as an attribute and decryption of said security element requires input of said user passphrase.

6. The method of claim 4, wherein said Device ID is one of: a serial number; an IMEI (International Mobile Equipment Identity) number; a digest or hash value derived from a phone number; or a digest or hash value derived from an email address.

7. The method of claim 1, wherein said security element is an OTP (One Time Password) credential for use with a secure server.

8. The method of claim 7, wherein said Device ID is one of: a serial number; an IMEI (International Mobile Equipment Identity) number; a digest or hash value derived from a phone number; or a digest or hash value derived from an email address.

9. The method of claim 1, wherein said random string is segmented into non-printable strings that are stored in different parts of said code of said software application.

10. The method of claim 9, wherein said Device ID is one of: a serial number; an IMEI (International Mobile Equipment Identity) number; a digest or hash value derived from a phone number; or a digest or hash value derived from an email address.

11. The method of claim 1, wherein said Device ID is one of: a serial number; an IMEI (International Mobile Equipment Identity) number; a digest or hash value derived from a phone number; or a digest or hash value derived from an email address.

12. A method of supplying a software application for encrypting a security element using the method in claim 1.

13. A method of supplying a software application for encrypting a security element using the method in claim 2.

14. A method of supplying a software application for encrypting a security element using the method in claim 4.

15. A method of supplying a software application for encrypting a security element using the method in claim 7.

16. A method of supplying a software application for encrypting a security element using the method in claim 5.

17. A method of supplying a software application for encrypting a security element using the method in claim 9.

18. A method of supplying a software application for encrypting a security element using the method in claim 11.

* * * * *